United States Patent [19]

Hart

[11] Patent Number: 5,423,002

[45] Date of Patent: Jun. 6, 1995

[54] SYSTEM FOR EXTENDING NETWORK RESOURCES TO REMOTE NETWORKS

[75] Inventor: John H. Hart, Saratoga, Calif.

[73] Assignee: 3Com Corporation, Santa Clara, Calif.

[21] Appl. No.: 203,691

[22] Filed: Feb. 28, 1994

Related U.S. Application Data

[63] Continuation of Ser. No. 871,113, Apr. 20, 1992, abandoned.

[51] Int. Cl.[6] .......................... G06F 13/00; H04J 3/00
[52] U.S. Cl. ........................... 395/200; 364/DIG. 1; 364/229; 364/242.95; 370/85.13
[58] Field of Search ............... 395/200, 325, 275, 250, 395/725; 370/85.13, 85.12, 85.14; 340/825.03

[56] References Cited

U.S. PATENT DOCUMENTS

| | | | |
|---|---|---|---|
| 4,456,957 | 6/1984 | Schieltz | 395/200 |
| 4,466,060 | 8/1984 | Riddle | 395/325 |
| 4,627,052 | 12/1986 | Houre et al. | 370/88 |
| 4,677,588 | 6/1987 | Benjamin et al. | 395/200 |
| 4,706,081 | 11/1987 | Hart et al. | 340/825.03 |
| 4,737,906 | 4/1988 | Edwards | 395/200 |
| 4,835,674 | 5/1989 | Collins | 395/275 |
| 4,887,075 | 12/1989 | Hirasawa | 395/200 |
| 4,901,312 | 2/1990 | Hui et al. | 370/85.12 |
| 4,914,619 | 4/1990 | Harris et al. | 395/200 |
| 4,922,503 | 5/1990 | Leone | 370/85.13 |
| 4,941,089 | 7/1990 | Fischer | 395/325 |
| 4,985,832 | 6/1991 | Grandalski | 395/300 |
| 5,086,426 | 2/1992 | Tsukakoshi et al. | 370/85.13 |
| 5,088,032 | 2/1992 | Bosack | 395/200 |
| 5,088,090 | 2/1992 | Yacoby | 370/85.13 |
| 5,150,464 | 9/1992 | Sidhu et al. | 395/200 |
| 5,179,660 | 1/1993 | Devany et al. | 395/200 |
| 5,214,646 | 5/1993 | Yacoby | 370/85.140 |
| 5,241,682 | 8/1993 | Bryant et al. | 395/800 |
| 5,280,481 | 1/1994 | Chang et al. | 370/85.13 |
| 5,303,238 | 4/1994 | Brodd et al. | 370/94.1 |
| 5,321,694 | 6/1994 | Chang et al. | 370/85.13 |

OTHER PUBLICATIONS

Transparent Services Access Facility Reference, Dec. 1986, pp. 1–7.

Tannenbaum, Computer Networks, 2nd Ed., Section 5.4, "Internetworking", pp. 320–350, 1988, Prentice-Hall.

Hart, Extending the IEEE 802.1 Mac Bridging Standard to Remote Bridges, "IEEE Network, The Magazine of Communications," Jan., 1988, vol. II, No. 1, pp. 10–15.

Benhamou, Integrating Bridges and Routers in a Large Internetwork, "IEEE Network", Jan., 1988, vol. I, No. 2, pp. 65–71.

Primary Examiner—Jack B. Harvey
Assistant Examiner—Ayaz R. Sheikh
Attorney, Agent, or Firm—Haynes & Davis

[57] ABSTRACT

A system for interconnecting networks transparently extends the multiprotocol routing functionality of a router across a communication link to a remote LAN, while requiring a device on the remote LAN which operates independent of the higher layer protocol suites. A boundary router, having a local routing interface coupled to the first network, and a remote routing interface coupled to the communication link, provides the higher level protocol suite services for routing frames of data to terminals in the first and second networks. A routing adapter extends the remote routing interface of the boundary router transparently across the communication link to the second network.

46 Claims, 6 Drawing Sheets

SYSTEM FOR EXTENDING NETWORK RESOURCES TO REMOTE NETWORKS

This application is a continuation of application Ser. No. 07/871,113, filed Apr. 20, 1992, now abandoned.

FIELD OF THE INVENTION

The present invention relates to the extension of network resources in computer networks; and more particularly to extending interfaces to systems such as routers in widely distributed networks to remote networks.

DESCRIPTION OF RELATED ART

A widely accepted series of international standards describing network architectures is known as the OSI reference model. See, generally, Tannenbaum, *Computer Networks,* 2nd Ed., 1988, Prentice-Hall. According to this model, network communications are divided into a plurality of protocols within layers of the model. Local Area Networks (LANs) operate using protocols within the lower layers, layers 1 and 2, of the OSI model, such as the carrier sense multiple access with collision detection CSMA/CD, IEEE Standard 802.3, also known as ETHERNET, and the token ring access ring method of IEEE Standard 802.5. These two lower layers are typically broken down into the physical layer and the data link layer, with the data link layer being further broken down into a media access control (MAC) layer, and a logical link layer. All MAC frames transmitted on a LAN contain distinct source and destination LAN addresses.

End systems, such as personal computers, workstations, and mainframe computers, attached to the LANs each have a distinct LAN address. LAN frames forwarded to an end system contain its address as a destination. LAN frames forwarded from an end system contain its address as a source address. Systems communicate by encapsulating additional protocols (OSI layers 3-7) within the lower layer LAN frames. These higher level protocols are grouped into suites such as the TCP/IP protocol suite and the XNS protocol suite. Many LANs contain groups of end systems that use different higher level protocol suites.

Today, LANs in remote sites are connected together using devices referred to as intermediate systems. Two of the most common types of intermediate systems used in this context are called remote bridges and routers. See, Hart, "Extending the IEEE 802.1 MAC Bridging Standard to Remote Bridges," *IEEE Network, the Magazine of Communications,* January, 1988, Vol. II, No. 1, pp. 10-15; Benhamou, "Integrating Bridges and Routers in a Large Internetwork," *IEEE Network,* January, 1988, Vol. I, No. 2, pp. 65-71; and Tannenbaum, supra, §5.4, "Internetworking", pp. 320-350.

802.1 bridges operate so that they appear transparent to the higher level protocol suites. Thus, they interconnect LANs transparently, from the perspective of the end systems attached to the LANs. That is, using a bridge, two interconnected LANs appear as if they were a single LAN to attached end systems operating in a single higher level protocol suite, such as the TCP/IP suite. Because of inherent self learning, automatic operation, and independence from the higher level protocol suites, remote bridges are easy to install and support in a multiple protocol suite environment.

There are two primary classes of LAN frames from the point of view of the higher level protocol suites. Single destination frames, which are received and processed by a single IAN end system, and multicast frames which are received and processed by a group of LAN end systems. Bridges learn the layer 2 end system LAN addresses, and can thereby identify the single destination LAN frames that need to be forwarded to remote interconnected LANs through the bridge independent of the LAN end system protocol suite. On the other hand, bridges automatically forward all multicast LAN end system frames to remote interconnected LANs.

When the number of interconnected LANs is small (e.g., less than 10) and interconnection media high speed (e.g., greater than or equal to 56,000 bits per second) the automatic forwarding of multicast frames by bridges is not a problem. However, as the number of interconnected LANs increases and/or the interconnection media speeds decrease, more and more of the interconnection media bandwidth is consumed by multicast frame traffic. Thus, less and less of the interconnection media bandwidth is available for single destination frames, which carry the bulk of the end system to end system workload.

In contrast, routers do not forward LAN frames generated by LAN end systems. Rather, they forward higher level protocol suite information in the LAN frames that is destined for remote end system. The higher level protocol suite information is received by a router in single destination LAN frames addressed to it by a connected LAN end system or other intermediate system, such as a router. Also, routers do not forward multicast frames. Rather, they receive multicast frames containing higher level protocol suite information which must be processed locally by the router. Consequently, low speed links are more effectively utilized by routers which do not propagate multicast frames. Also, because routers operate according to higher level protocols, and have access to protocol suite dependent information, routers have traffic control ability to support very large numbers of interconnected LANs. However, the protocol suite dependent operation of routers makes them more difficult to install and support than bridges, particularly as the number of routed protocol suites increase.

In many of today's corporate networks, large and medium sized data network sites are interconnected remotely using routers, while bridges handle local LAN to LAN interconnection. These large and medium sized sites typically employ data network specialists who are responsible for the installation and maintenance of the data network equipment, including the routers.

However, many LANs in smaller sites are not interconnected with networks in the large and medium sized sites. Thus, these smaller sites are isolated from effective communication through the corporate networks. The isolated sites are relatively large in number, often use multiple protocol suites, and may have little or no local data networking expertise. Further, these small sites may comprise a single LAN which will not have a need for high volume communications with the wider network and may not support the expense of high speed links to remote sites. Thus, it can be expected that these smaller sites will use low speed (e.g., 9600 to 19,200 bits per second) full period or switched communication circuits for linking to remote LANs.

Because of the large number of small sites and associated low speed links that will be utilized for interconnecting them with wider networks, routers appear to be the right type of intermediate system for internetworking. However, the lack of networking expertise to install and maintain routers in small sites conflicts with their use. Therefore, it is desirable to provide an optimal interconnection solution for these small sites which has the effective traffic control of a multi-protocol router, and protocol suite independent simplicity of a bridge.

SUMMARY OF THE INVENTION

The present invention provides system for transparently extending network resources, such as the multi-protocol routing functionality of a router, to a remote LAN, while requiring a device on the remote LAN which operates independent of the higher level protocol suites under which the extended network resources operate.

Thus, two new classes of intermediate systems are provided which support internetwork multiprotocol routing, termed herein a routing adapter and a boundary router. From the perspective of the end systems on interconnected LANs, a routing adapter and a boundary router provide the same functionality as two interconnected routers. Using this technique, a small site LAN may install a routing adapter which operates independent of the higher level protocol suites without the network management responsibility that is attendant with those higher level protocol functions. The routing adapter is coupled to a communication link which provides point to point communication from the routing adapter to the boundary router. The boundary router provides the higher level protocol suite services by way of the direct communication link and the routing adapter to the remote LAN. The boundary router also provides the higher level protocol suite services to the attached local LAN directly.

According to one aspect of the present invention, an apparatus for connecting a first LAN to a second LAN comprises a communication link, a boundary router, having a local routing interface coupled to the first LAN, and a remote routing interface coupled to the communication link, and providing the higher level protocol suite services for routing frames of data to end systems in the first and second LAN. The system also includes a routing adapter for extending the remote routing interface of the boundary router transparently across the communication link to the second LAN.

The boundary router applies a LAN address for the local routing interface as source address of frames routed to the local LAN, and a network address of the remote routing interface/routing adapter as the source address to frames routed to the second network.

According to another aspect, the routing adapter comprises an intermediate system on the second network which is responsive to destination addresses in frames that fall within a programmed set of addresses, for forwarding frames of data having a destination address within the programmed set from the second LAN across the communication link to the boundary router, and forwarding frames received from the boundary router by way of the communication link to the second LAN. The programmed set of addresses includes a unique LAN address for the routing adapter/remote routing interface pair, and a set of group addresses for multicast frames which need to be processed by the higher level protocol suite services in the boundary router.

By transparently extending an interface to routing resources across a communication link to a device which operates independent of the higher level protocol suites, a small remote LAN can be effectively coupled to a wider network, without the expense and complexity of installing a router or other intermediate system requiring sophisticated local support, or without requiring expensive higher speed links between the small remote LAN and the wider corporate data network that a remote bridge could require because it forwards all multicast frames.

Other aspects and advantages of the present invention can be seen upon review of the figures, the detailed description, and the claims which follow.

DESCRIPTION OF THE PREFERRED EMBODIMENTS

A detailed description of preferred embodiments of the present invention is provided with respect to FIGS. 1–7.

I. System Overview

Figure 1:
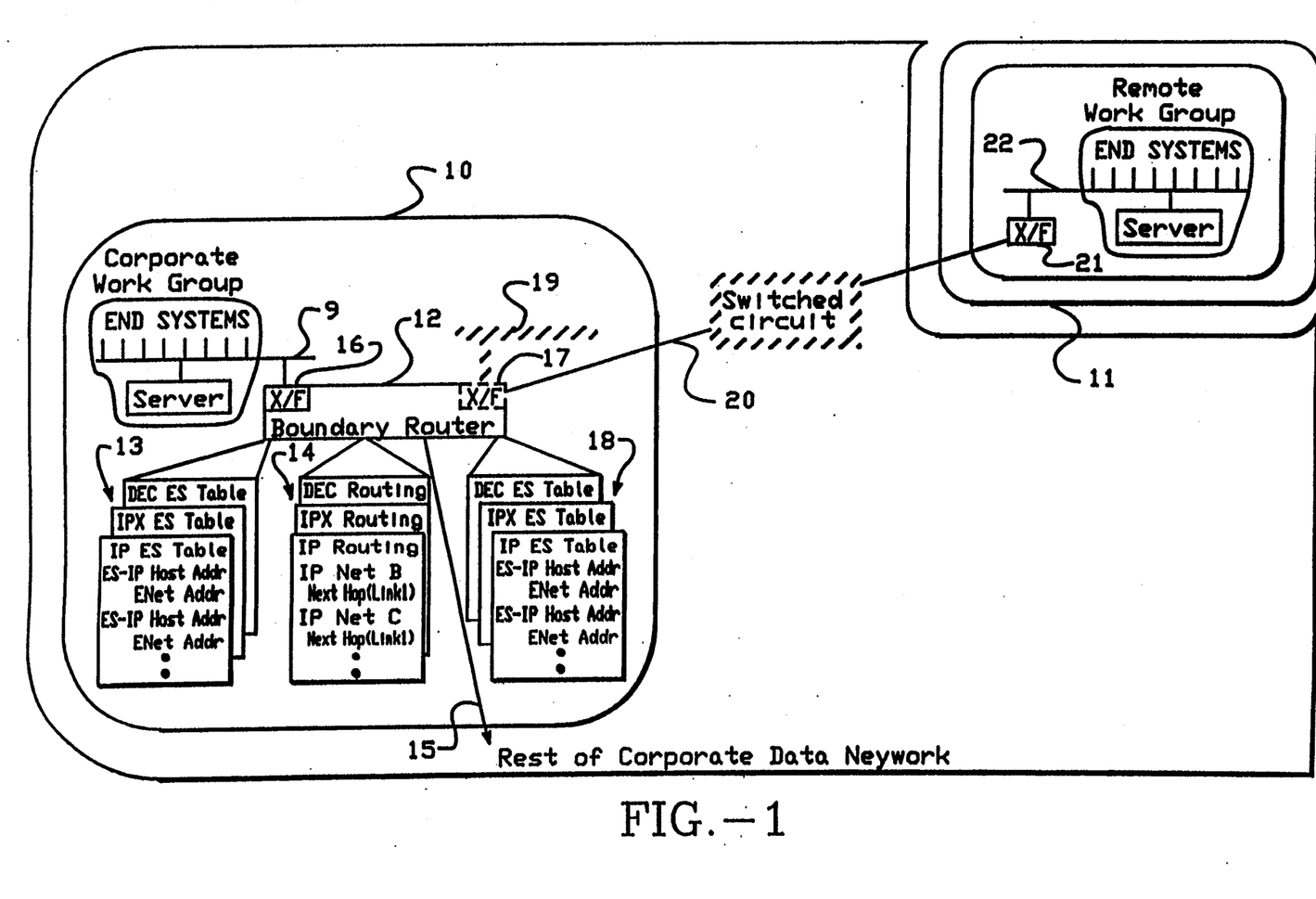
FIG. 1 is a schematic diagram of a network interconnected with a boundary router and routing adapter according to the present invention.

FIG. 1 provides a schematic diagram of an apparatus for connecting a first network 10 to a second network 11. The first network 10 includes a first LAN 9 which includes a plurality of end systems and a server, and may be interconnected to other LANs using intermediate systems (not shown) known in the art. Coupled to the LAN 9 is a boundary router 12. The boundary router 12 is an intermediate system in the network which provides network resources serving higher level protocol suites, which, in one unique embodiment, constitute routing resources. As such, the boundary router 12 maintains end system directories 13 for the local LAN 9 and global routing information 14 to serve the routing functions according to the higher level protocol suites. Thus, the end system directories will include DEC end system tables, IPX end system tables, IP end system tables, and others to serve other protocol suites that are operating in the network 10. The boundary router 12 may also be coupled to other portions of the corporate data network as schematically illustrated at arrow 15.

The boundary router 12 includes a local interface 16 which serves the local LAN 9 providing access to the network resources within the boundary router to end systems on LAN 9. The boundary router could also interface to other local LANs as well. In addition, the boundary router 12 includes a remote routing interface 17, which provides an interface to the network resources for end systems in the remote network 11. In support of the remote interface 17, the boundary router maintains end system directories 18 serving the higher level protocol suites in the remote network 11.

As illustrated schematically by the hatched symbol 19, the remote network 11 appears to the end systems in the local LAN 9 as if it were a LAN connected locally to the boundary router 12. This appearance is maintained across a communication link 20, which may use telephone or other dial up lines, leased lines, satellites, wireless systems, or other communication media, to a routing adapter 21, which is coupled to the remote network 11. The remote network 11 includes a remote LAN 22 to which a plurality of end systems and a server may be connected as known in the art. In addition, the LAN 22 may be coupled to other LANs in the remote network 11 through intermediate systems (not shown) as known in the art. The routing adapter 21 provides means for extending the remote routing interface 17 transparently to the network 11 across the communication link 20. From the perspective of the remote network 11, the routing adapter 21 provides the same functionality as a router, while it operates independent of the higher level protocol suites.

Figure 2A:
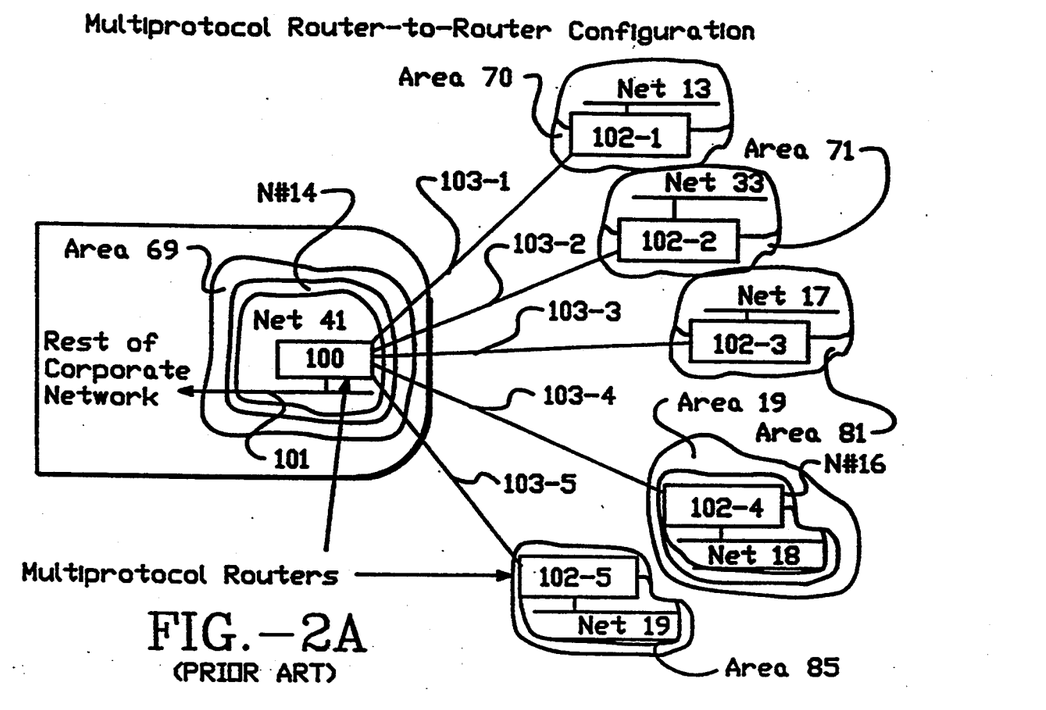
FIGS. 2A and 2B illustrate the prior art multi-protocol router to router configuration, and the boundary router to routing adapter configuration of the present invention, respectively.
Figure 2B:
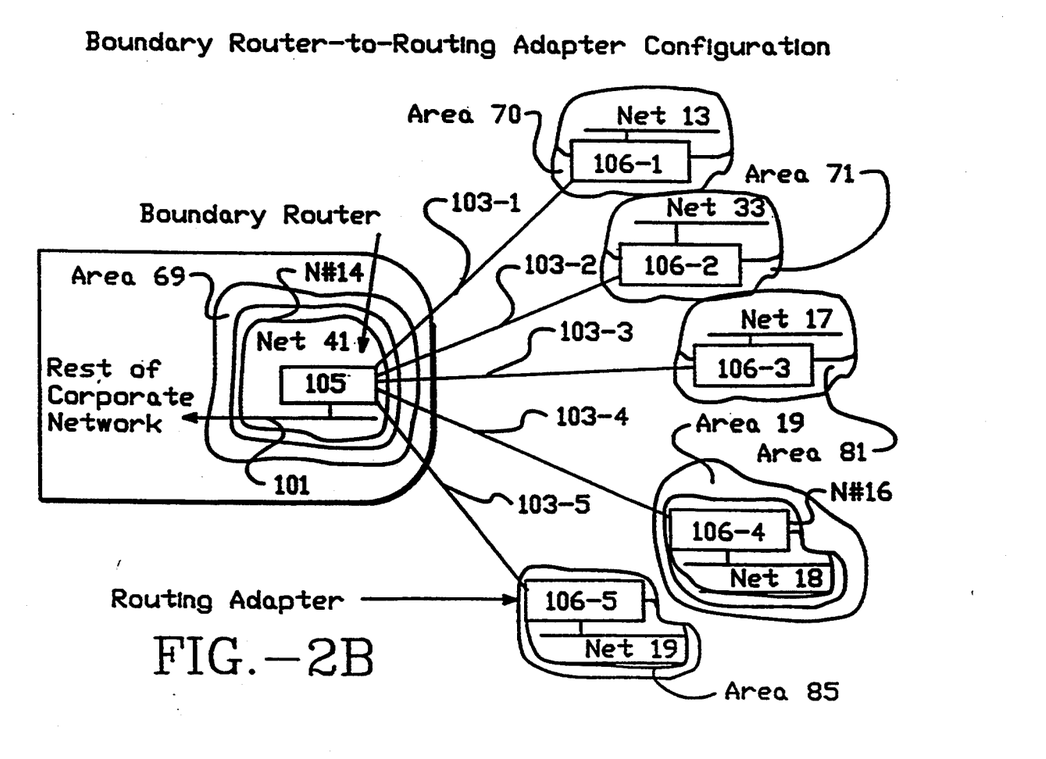

As illustrated in FIGS. 2A and 2B, from perspective of the end systems on the interconnected LANs (e.g., local LAN 9 and remote LAN 22), a routing adapter 21 and a boundary router 12 provide the same functionality as two interconnected routers. For example, each LAN must be assigned a separate network ID for each routed protocol.

As illustrated in FIG. 2A, the prior art corporate network may include a multiprotocol router 100 coupled to a local LAN 101. This local LAN may be given the identifier net 41, for one protocol suite, the identifier N#14 for a second protocol suite, and identifier area 69 for a third. This net may be further connected to the rest of the corporate network using other intermediate systems known in the art. The multiprotocol router 100 may then be coupled to a plurality of remote routers 102-1 through 102-5 by means of independent communication links 103-1 through 103-5. Each of the remote multiprotocol routers (102-1 through 102-5) is coupled to a respective net which operates protocol suites which are given network identifiers.

FIG. 2A is representative of a prior art system. The multiprotocol routers 100 and 102-1 through 102-5 each operate within the higher protocol levels which serve the routing algorithms. Thus, each requires sophisticated operator services and it is a relatively complex and expensive device.

As illustrated in FIG. 2B, the same network configuration can be served by the boundary router/routing adapter system of the present invention. As can be seen, a boundary router 105 is coupled to the local LAN 101 in the corporate network, replacing the multiprotocol router 100 of FIG. 2A. Each of the remote networks are connected to the boundary router 105 across the communication links 103-1 through 103-5 to a routing adapter 106-1 through 106-5. From the point of view of the routing algorithms and end systems, each of the remote networks is assigned a network identifier precisely as done for the prior art multiprotocol router configuration of FIG. 2A. Also, higher layer protocol exchanges across the LAN segments will be identical in both configurations. Thus, the resources in the boundary router 105 are extended across the communication links 103-1 through 103-5 to the remote networks transparently, from the point of view of end systems and other intermediate systems on the remote networks.

The system thus provides efficient communication between remote networks, and a corporate network, through a boundary router (e.g., net 13, boundary adaptor 106-1, link 103-1, boundary router 105, net 41), and from one remote network through a boundary router on the corporate network to other remote networks (e.g., net 13, boundary adaptor 106-1, link 103-1, boundary router 105, link 103-2, boundary adaptor 106-2, net 33).

II. Functional Design of a Boundary Router and Routing Adapter

Figure 3:
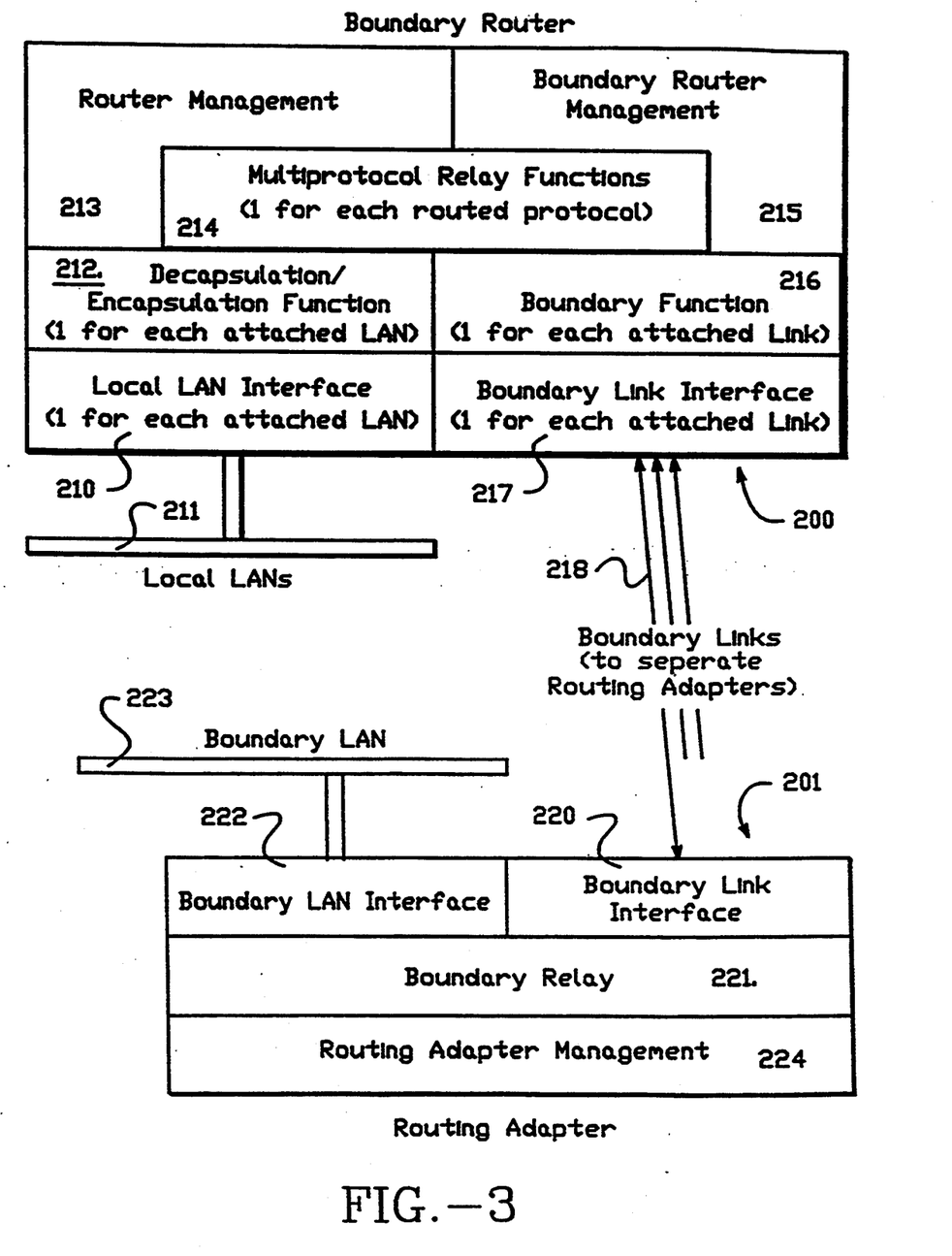
FIG. 3 is a functional block diagram of a boundary router and routing adapter according to the present invention.

FIG. 3 illustrates the functional design of a boundary router (generally 200) and a routing adapter (generally 201).

When a single boundary LAN is attached to the routing adapter, as illustrated in FIG. 3, the routing adapter/boundary router functionality appears to be an end system on boundary LAN, just like a normal router.

The design of the new functionality of a boundary router and a routing adapter is defined below.

A. Boundary Router Design

A boundary router, as shown in FIG. 3, includes at least one local LAN interface 210 for attachment to a local LAN 211. There is one local LAN interface for each attached LAN, as indicated in the figure. Each local LAN interface will be given a LAN address for use by the routing resources on the boundary router. Coupled to the local LAN interface is a decapsulation-/encapsulation function 212, also one for each attached LAN. The decapsulation/encapsulation function 212 is coupled to router management 213 and multiprotocol relay 214 functions which are implemented for each routed protocol. Extensions to the boundary router to serve the remote network include boundary router management 215, a boundary function 216, and a boundary link interface 217. The boundary link interface 217 is connected to a boundary link 218 which provides communication with a boundary link interface 220 on the routing adapter 201. The boundary link interface 220 is coupled to a boundary relay function 221 and through the relay function 221 to a boundary LAN interface 222. The boundary LAN interface 222 is coupled to the boundary LAN 223. Also, routing adapter management logic 224 is coupled to the boundary relay 221 for performing management functions.

Thus, a boundary router contains all the logic of a multiprotocol router (such as NETBuilder, available through 3COM Corporation, Santa Clara, Calif.) plus boundary functionality for the boundary links that interconnect the boundary router to the routing adapter. The additional functionality consists of boundary router management 215, boundary function 216, and the interface to the boundary link interface 217.

Boundary router management 215 provides the equivalent set of functions for the boundary LAN(s) 223 as router management 213 provides for the local LANs 211. It also assists in the management of the boundary link 218 and routing adapter 201.

The boundary router management 215 is responsible for maintaining the boundary LAN end system directories for the linked boundary LANs just as the router management function 213 maintains a local LAN end system directory for its attached local LANs.

For attached local LANs, the local LAN end system directory is maintained through protocol frame exchanges between the router management function 213 and end systems attached to the local LAN 211. These protocols are termed End System to Intermediate System (ES-IS) protocols. Typically, each higher level protocol supported by the router has its own ES-IS protocol.

The boundary router management function 215 supports the same ES-IS protocols as routing management function 213. Each boundary LAN end system directory is maintained through protocol frame exchanges between the boundary router management function 215 and end systems attached to the remote boundary LAN 223.

The flow of frames from the boundary router management function 215 is initiated by the boundary router management function 215 passing the ES-IS protocol messages directly to the boundary function 216 for forwarding on to the boundary LAN end systems. The reverse flow of ES-IS frames from the boundary LAN end systems to the boundary router management function 215 is also supported.

The boundary router management function 213 is also responsible for facilitating the management of linked routing adapters 201 by allowing the same level of visibility and control of the linked boundary LAN(s) 223 as is provided by the router management function 213 for the attached local LANs 211. Also, extended visibility and control of the boundary links 218, interfaces 217, etc. can be provided.

All management requests, responses, etc., are initially received by the router management function. Router management frames from attached local LANs 211 are forwarded to the router management function 213 in a boundary router just as they would be in a regular router. As is seen below, the same is true for router management frames from linked boundary LANs 223, because a routing adapter 201 forwards management frames received on the boundary LAN 223 across the boundary link 218 to the boundary router 200.

The boundary router management 215 handles the management requests, responses, parts of requests, etc., having to do with the boundary LAN 223 (e.g., determining/knowing the boundary LAN type-ETHERNET, TOKEN RING, or FDDI). Boundary router management 215 gathers, sets, and changes remote boundary LAN information by sending/receiving frames to/from the routing adapter management function 224. Likewise, it can manage other aspects of the boundary router/routing adapter domain (e.g., setting, changing, and gathering local/remote information about both ends of the boundary link).

The boundary function 216 is positioned between the multiprotocol router relay functions 214 and the boundary link interface function 217. There is one boundary function 216 and boundary link interface 217 pair associated with each boundary link 218. The multiprotocol router relay function 214 interfaces to each boundary function/boundary link interface pair separately. Each pair constitutes a uniquely addressed extended remote interface to the routing resources in the boundary router, which is transparently extended across the respective link 218 to the routing adaptor 201.

The boundary function 216 is responsible for providing the same interface as the encapsulation/decapsulation function 212 provides for an attached local LAN 211. This means that the multiprotocol relay function 214 does not distinguish between attached local LANs and linked boundary LANs.

The boundary function 216 is also responsible for encapsulating/decapsulating higher level protocol information to/from the format of the remote boundary LAN 223 (e.g., ETHERNET, TOKEN RING, or FDDI, etc.) just like a encapsulation/decapsulation function 212 does for its attached local LAN 211.

For encapsulation, the LAN specific frame format information of the boundary LAN 223 and the source address value for the remote interface to the boundary router is learned through local configuration information or through a protocol exchange between the boundary router management 215 and routing adapter management 224 in the linked routing adapter. The LAN frame destination address values are passed by the multiprotocol relay function 214 which obtains them from a boundary LAN end system directory maintained by boundary router management function 215.

In the boundary function, encapsulated frames are passed to/received from the boundary link interface function 217.

The boundary link interface function 217 is positioned between the boundary function 216 and the boundary link 218. The boundary link interface 217 works in with its peer boundary link interface function 220 in the routing adapter 201 and is responsible for transmitting and receiving frames to and from the boundary link 218. The functionality of the boundary link interface includes encapsulating/decapsulating the LAN frames within/from a protocol, like Internet's Point to Point Protocol (PPP) that indicates, among other things, if the 32 bit Frame Check Sum is PRESENT/NOT PRESENT, the LAN frame format, whether acknowledgements are required, etc.

Compression/decompression of transmitted/received frames may also be done by the boundary link interface function 220 using any of a variety of compression protocols.

During physical link transmission/reception across the boundary link 218, the boundary link interface 220 adds a delimiting protocol like ISO 3309. During physical link reception, the frame must be reconstructed from the delimiting protocol and invalid frames discarded (e.g., frames with a bad frame check sums).

B. Routing Adapter Design

A routing adapter functions independent of the protocol suites encapsulated in LAN frames received/transmitted across boundary LAN 223 and link 218 to which it is attached. The routing adapter functionality consists of boundary link interface 220, boundary LAN interface 222, boundary relay 221, and routing adapter management 224.

The boundary link interface function 220 is positioned between the boundary link 218 and boundary relay function 221. The boundary link interface 220 in the routing adapter 201 works with its peer boundary link interface function 217 in the boundary router 200 and is responsible for transmitting and receiving frames to and from the boundary link 218. The functionality of the boundary link interface 220 is essentially identical to the boundary link interface 217 in the boundary router 200 as described above.

The boundary LAN interface function 222 is positioned between the boundary LAN 223 and boundary relay 221. The boundary LAN interface 222 is responsible for transmitting and receiving frames to and from the boundary LAN 223. The functionality of the boundary LAN interface 222 is the same as that of the equivalent function in a router and includes the following:

1. handling the physical and data link protocols, etc., as defined by the boundary LAN 223;
2. transmitting frames relayed by boundary relay function 221; and
3. passing valid received LAN data frames to the boundary relay function 221 which have a destination address within a programmed set of addresses including the address of the extended remote interface to the boundary router, or group address(es) set by routing adapter management function.

The boundary relay function 221 includes the adaptor's frame relay logic and operates independent of higher level protocol suites. The frame relay logic of a routing adapter 201 is defined by the following two rules.

1. Any frame passed from the boundary LAN 223 to the boundary relay 221 is forwarded to its boundary link interface 220 unless link 218 is not operational. In this case, it may be network management frame and it is passed to the routing adapter management function 224. This allows the routing adapter to be managed locally when the link is not operational. For instance, the routing adapter management 224 may respond to management frames which request an attempt to re-open a link, such as by attempting re-dials on dial links.
2. Any frame received from its boundary link interface 220 is forwarded to the boundary LAN interface 222 unless its destination equals the routing adapter's LAN address. In this case, it is a network management frame from the boundary router management function 215 and it is passed to the routing adapter management function 224.

Routing adapter management 224 maintains local configuration information such as the LAN type of the boundary LAN 223 and the multicast destination addresses to be received.

Also, the routing adapter management 224 operates as the agent of the boundary router management function. As such, it is responsible for processing and responding to management requests, responses, etc., received from it.

Further, the routing adapter management 224 is responsible for processing and responding to management requests, responses, etc., received from end systems on the boundary LAN 223 when the boundary link 218 is not operational.

III. System Enhancements

In addition to the basic functionality described above, FIGS. 4 and 5 illustrate that the system according to the present invention may include routing adapters capable of supporting multiple boundary LANs, and multiple boundary links to different boundary routers.

Figure 4:
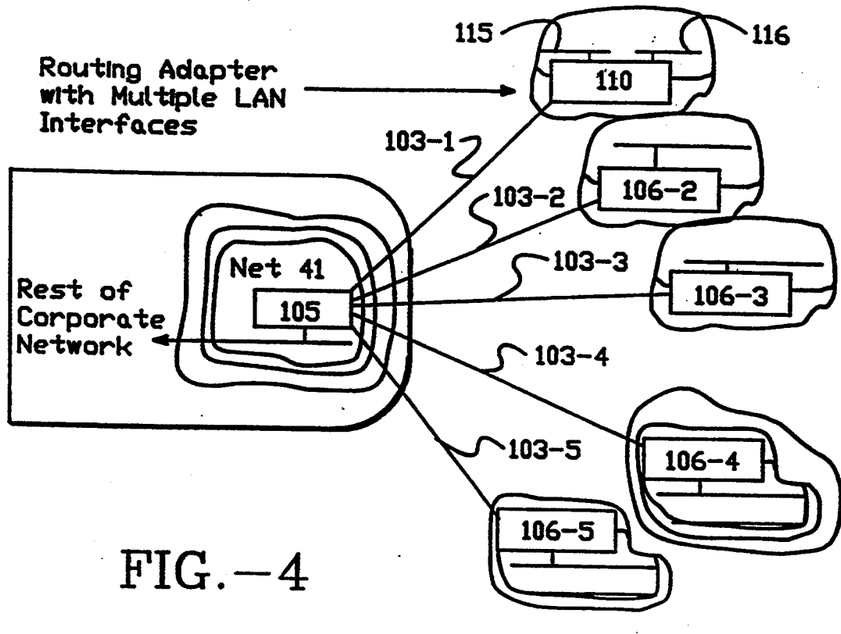
FIG. 4 schematically illustrates the configuration of a network using a routing adapter with multiple LAN interfaces.
Figure 5:
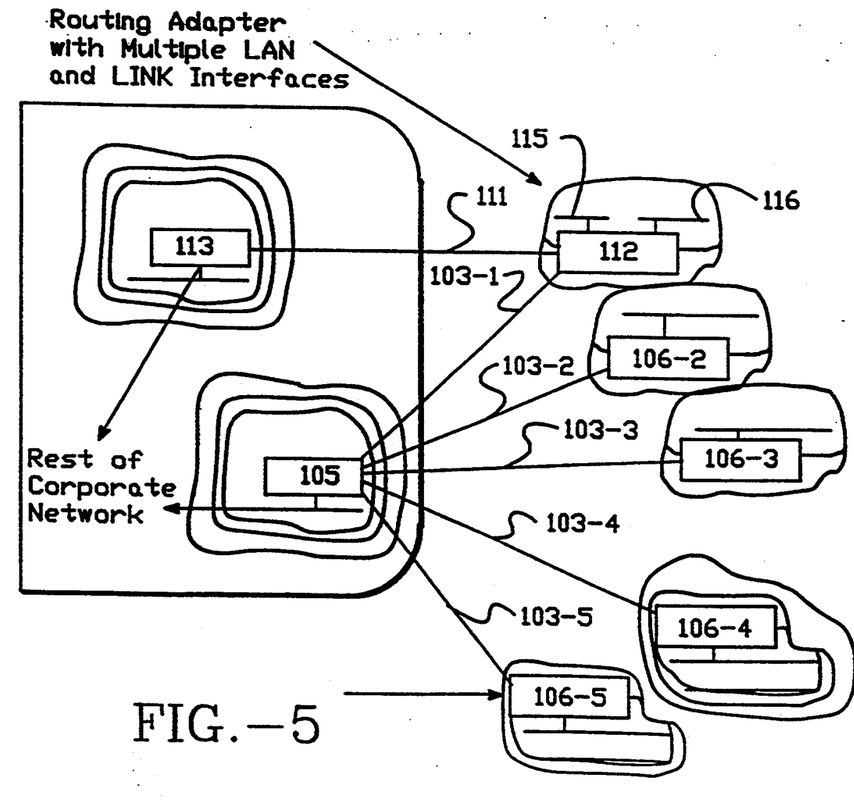
FIG. 5 schematically illustrates a network utilizing a routing adapter with multiple LAN and link interfaces according to the present invention.

FIGS. 4 and 5 illustrate these features in the format of FIG. 2B where like components have like reference numbers. Thus, in FIG. 4, there are five links 103-1 through 103-5 coupled to five routing adapters including a routing adapter 110 having multiple LAN interfaces to LANs 115, 116 and routing adapters 106-2 through 106-5 like that shown in FIG. 2B.

FIG. 5 illustrates a system in which a routing adapter 112 is further coupled to a second communication link 111 to a second boundary router 112. Thus, the routing adapter 112 has multiple boundary links and multiple boundary LAN interfaces.

Figure 6:
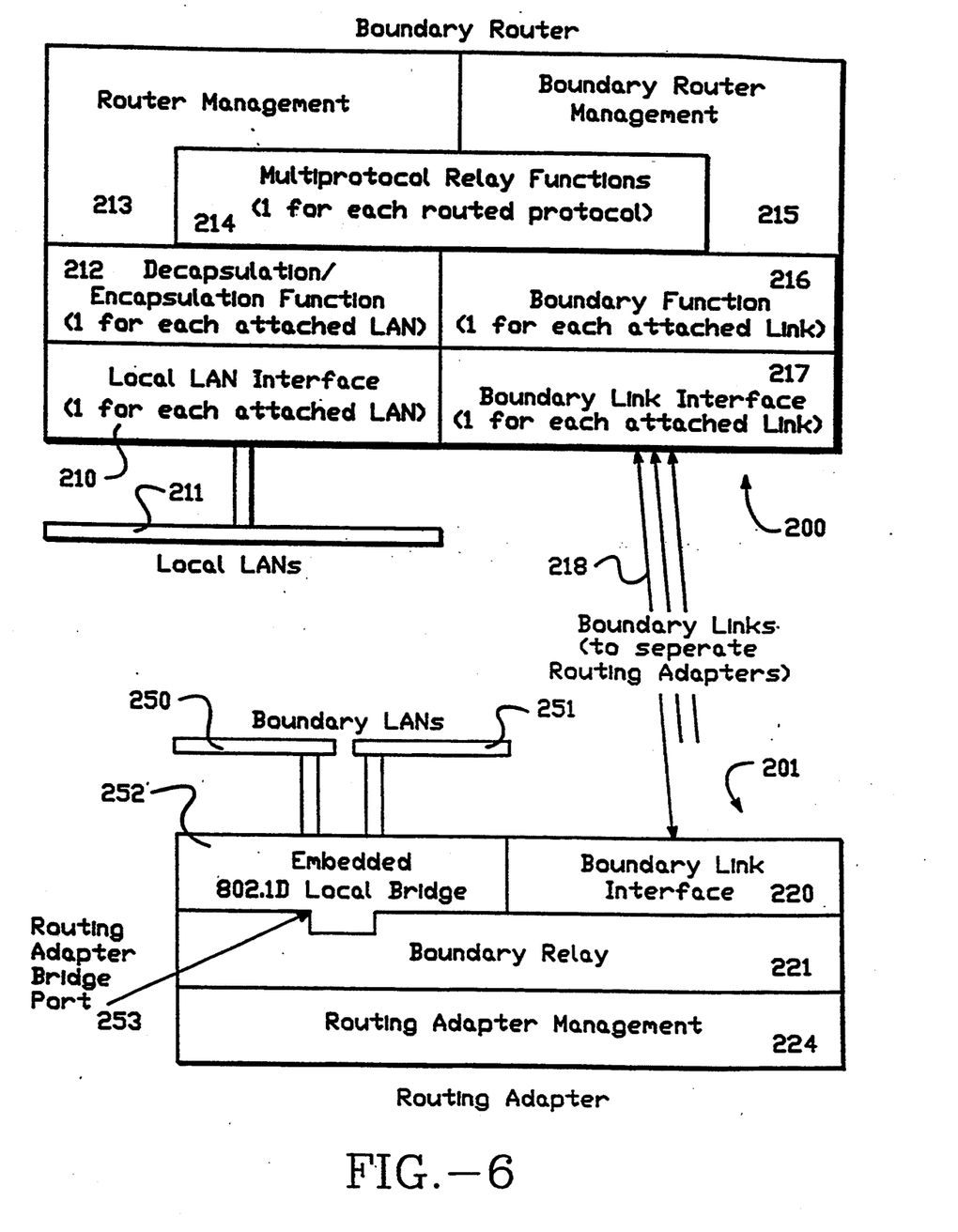
FIG. 6 is a functional block diagram of a boundary router and routing adapter for systems including a plurality of boundary LANs coupled to the routing adapter.
Figure 7:
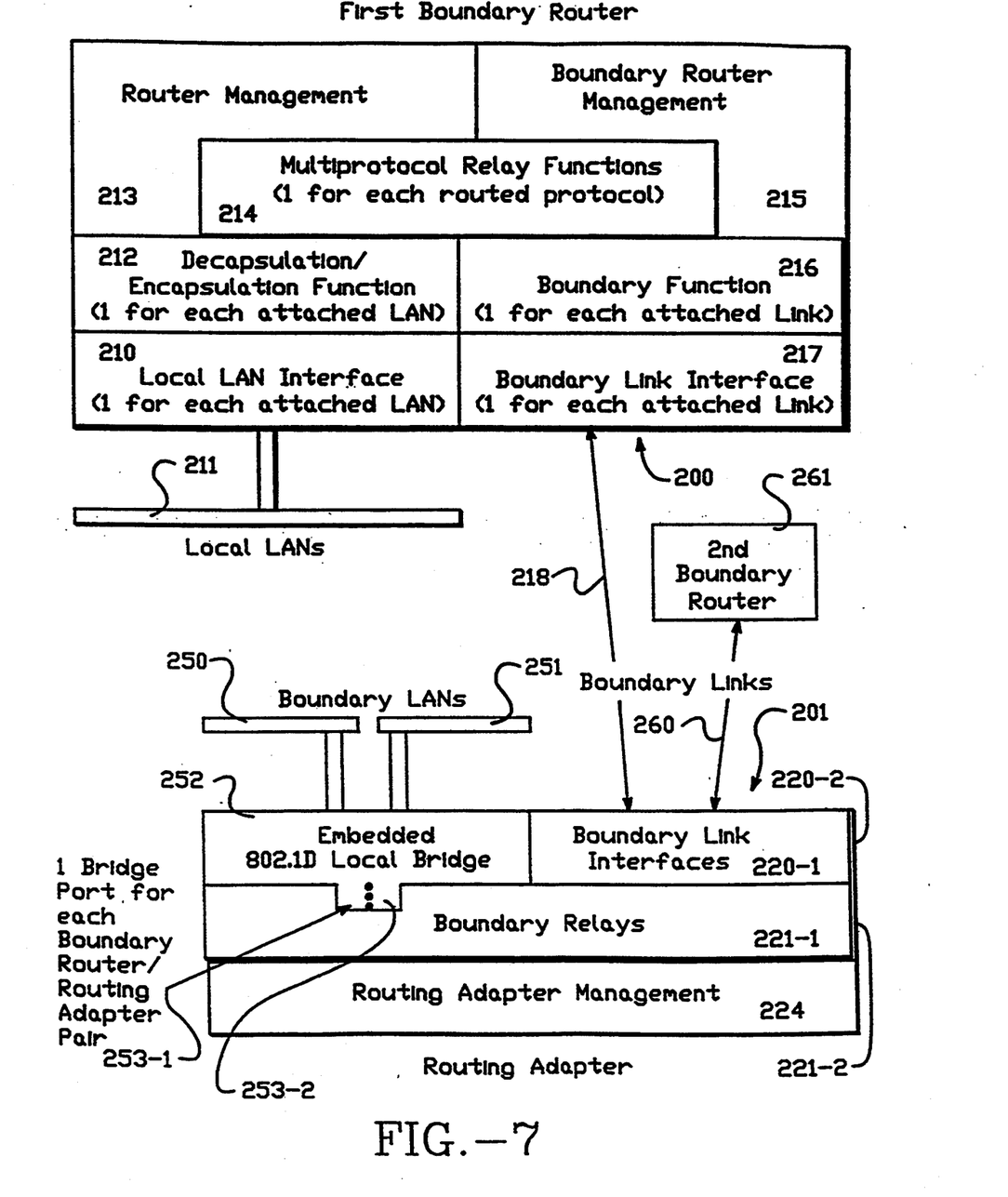
FIG. 7 is a functional block diagram of a boundary router and routing adapter configuration using a plurality of boundary routers coupled to a routing adapter.

The functional enhancements to the boundary router and routing adapters of FIG. 4 including multiple boundary LANs, are illustrated in FIG. 6. The extensions to the boundary router and routing adapter supporting plural boundary LANs and plural boundary links of FIG. 5 are illustrated in FIG. 7. FIGS. 6 and 7 are shown in the style of FIG. 3, with like components having like reference numbers.

FIG. 6 illustrates a routing adapter having multiple boundary LANs 250, 251 coupled to the routing adapter 201. In this case, a transparent embedded bridge 252, such as an embedded 802.1D local bridge, having a routing adaptor bridge port 253, replaces the boundary LAN interface 222 of FIG. 3. This results in the routing adapter/boundary router system functionally appearing to be an end system on a set of transparently connected boundary LANs 250/251. The frames forwarded across the bridge port 253 associated with the routing adapter are the same as those forwarded by the boundary LAN interface function discussed earlier (e.g., routing adapter remote interface address, and group address(es) programmed by the routing adapter management function). Therefore, from the routing adapter's point of view, the embedded 802.1D local bridge looks the same as a single boundary LAN interface.

When the bridging function 252 is present (even if only one boundary LAN is attached) then a routing adapter 201 can also support multiple boundary links (e.g., links 218 and 260) to different boundary routers (e.g., a first boundary router 200 and a second boundary router 261) as shown in FIG. 7.

In the extensions to the routing adapter 200 of FIG. 7, there is one bridge port for each boundary router/routing adapter pair. Thus, for link 218 there is one bridge port 253-1, and for link 260 there is a second bridge port 253-2.

Support for multiple boundary links to different boundary routers is accomplished by creating one set of boundary relay and boundary link interface functions for each linked boundary router (220-1/221-1, 220-2/221-2). Each set of boundary relay and boundary link interface functions is attached to separate bridge port (253-1,253-2) with each port receiving frames that are addressed to a routing adapter/remote interface which is different for each linked boundary router and group address(es) programmed by the routing adapter management function. In this case, each boundary router/routing adapter pair appears to be an end system on the boundary LAN on a set of transparently bridged boundary LANs 250, 251.

IV. Conclusion

Thus, two new classes of intermediate systems for routing in a network are provided which have been labelled a boundary router and a routing adapter in the present specification. This technique allows for the extension, transparently, of network resources on a system in a first network across a communication link to a second network, while relieving the second network of more complex system and network operator services which may be required to distribute the network resources effectively, and minimizing traffic on the communication links between the networks to those frames which are necessary for the network services. As explained above, the technique is particularly suitable for extending multiprotocol routing resources to remote small local area networks using low speed communication links.

Therefore, the present invention provides an optimal LAN interconnection solution for the small sites that provides both the traffic control of a multiprotocol router, and the protocol suite independent simplicity of a bridge.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An apparatus that connects a first network located in a particular site and a second network located in a remote site, so that resources on the first network appear to users of the second network as if such resources were located on the second network, comprising:

a first processor, having a first interface on the first network through which network frames of data are transmitted and received to and from the first network and an extended interface through which network frames of data are transmitted and received to and from the second network, the first processor providing network services to network frames of data received through the first and extended interfaces from users of the first and second networks and transmitting network frames of data through the first interface to users of the first network and through the extended interface to users of the second network; wherein the extended interface includes a point-to-point communication link from the particular site to the remote site, having a first link interface at the particular site coupled to the first processor and a remote link interface at the remote site, the network frames encapsulated and decapsulated according to a communication link format in the first link interface and the remote link interface, and a second processor, on the second network in the remote site and coupled to the extended interface, the second processor forwarding network frames of data from users of the second network addressed to the extended interface through the remote link interface to the first processor, and forwarding network frames of data received from the extended interface to the second network so that the first processor appears to users of the second network as if it was on the second network.

2. The apparatus of claim 1, wherein the network services include routing services to apply lower level protocol destination network addresses to frames of data which include higher level protocol destinations and are received through the first and extended interfaces, and the first interface has a lower level protocol network address on the first network and the extended interface has a lower level protocol network address on the second network.

3. The apparatus of claim 2, wherein the routing services apply the lower level protocol network address of the first interface as source address to network frames of data routed through the first network and the lower level protocol network address of the extended interface as source address to network frames of data routed through the second network.

4. The apparatus of claim 2, wherein the first processor includes means for maintaining end system directories for end systems in the first and second networks to support routing of network frames received from the first and second networks.

5. The apparatus of claim 1, wherein the network services include routing services supporting routing algorithms of a plurality of higher level protocol suites, and the extended interface operates to encapsulate and forward network frames of data transparent to the higher level protocol suites.

6. The apparatus of claim 1, wherein the second processor includes management resources for responding with messages to the second network in the event that the communication link is inoperable.

7. The apparatus of claim 1, wherein the communication link comprises a point-to-point channel in a public switched network, connecting the first processor and the second processor.

8. An apparatus that connects a first network and a plurality of remote networks, comprising:

a plurality of communication links;

a first processor, having a local interface coupled to the first network through which frames of data are transmitted and received to and from the first network and a plurality of extended interfaces including respective communication links in the plurality of communication links through which frames of data are transmitted and received to and from the respective communication links, the first processor providing network services to frames of data received through the local interface from users of the first network and through the plurality of extended interfaces from users of the plurality of remote networks and transmitting frames of data through the local interface to users of the first network and through the plurality of extended interfaces to users of the plurality of remote networks; and wherein the plurality of extended interfaces include respective adaptor processors, coupled to corresponding networks in the plurality of remote networks and to corresponding communication links in the plurality of communication links, each particular adaptor processor forwarding frames of data from users of the corresponding remote network addressed to the respective extended interface across the corresponding communication link to the first processor, and forwarding frames of data received from the first processor across the corresponding communication link to the corresponding remote network.

9. The apparatus of claim 8, wherein the network services include routing services to apply lower level protocol destination network addresses to frames of data which include higher level protocol destinations and are received through the local interface and the plurality of extended interfaces, and the local interface and the plurality of extended interfaces have respective lower level protocol network addresses.

10. The apparatus of claim 9, wherein the routing services apply the lower level protocol network address of the local interface as source address to frames routed to the first network and the lower level protocol network address of the corresponding extended interface as source address to frames routed to networks in the plurality of remote networks.

11. The apparatus of claim 8, wherein the first processor includes means for maintaining end system directories for end systems in the first network and in the plurality of remote networks to support routing among the first network and the plurality of remote networks.

12. The apparatus of claim 8, wherein the network services include routing services supporting routing algorithms of a plurality of higher level protocol suites, and the plurality of adaptor processors operate to forward frames of data transparent to the higher level protocol suites.

13. The apparatus of claim 8, wherein the adaptor processors include management resources for responding with messages to the corresponding remote network in the event that the corresponding communication link is inoperable.

14. The apparatus of claim 8, wherein at least one of the plurality of communication links comprises a point-to-point channel in a public switched network, connecting the corresponding first processor and the corresponding adaptor processor.

15. The apparatus of claim 8, wherein the network services comprise a multiprotocol router for routing frames among the plurality of remote networks and the local network.

16. The apparatus of claim 15, wherein the multiprotocol router includes resources for routing frames between interfaces, extended interfaces in the plurality of extended interfaces, and resources for routing frames between the local and respective ones of the plurality of extended interfaces.

17. An apparatus that connects a first network to a second network, comprising:
 a communication link;
 routing means, connected to the first network and to the communication link, for routing frames of data according to a plurality of higher level protocols through the first and second networks in response to frames received from users of the first network and by way of the communication link from users of the second network; and
 routing adaptor means connected to the second network and to the communication link, and including memory for storing a programmed set of lower level protocol network addresses, and responsive to destination lower level protocol network addresses within the programmed set in frames of data on the second network, for forwarding frames of data having a destination lower level protocol network address within the programmed set from users of the second network across the communication link to the routing means, and forwarding frames of data received from the routing means by way of the communication link to users of the second network.

18. The apparatus of claim 17, wherein the routing means applies a first lower level protocol source address to frames routed to the first network and a second lower level protocol source address to frames routed across the communication link to the second network.

19. The apparatus of claim 17, wherein the routing adaptor means has a lower level protocol routing adaptor address, and the programmed set includes the routing adaptor address.

20. The apparatus of claim 19, wherein the routing means applies a first lower level protocol address as a source address to frames routed to the first network and the routing adaptor address as a source address to frames routed across the communication link to the second network.

21. The apparatus of claim 19, wherein the programmed set includes a list of group addresses which identify frames to be processed by the routing means.

22. The apparatus of claim 17, wherein the routing means includes means for maintaining end system directories for the first and second networks for support of routing in the first and second networks.

23. The apparatus of claim 17, wherein the routing means includes routing resources supporting routing algorithms of a plurality of higher level protocol suites, and the routing adaptor means operates independent of the higher level protocol suites.

24. The apparatus of claim 17, wherein the routing adaptor means includes management resources for responding with messages on the second network to frames having lower level protocol destination addresses within the programmed set in the event that the communication link inoperable.

25. The apparatus of claim 17, wherein the communication link comprises a point-to-point channel in a public switched network, connecting the routing means and the routing adaptor means.

26. An apparatus that connects a first network through a communication link to a remote system providing network resources on a second network, comprising:
 a processor, connected to the communication link and to the second network and having a network address, which provides an extended interface to the network resources in the remote system, by encapsulating and forwarding frames of data from users of the first network having a destination address equal to the network address of the extended interface, across the communication link to the remote system on the second network, and decapsulating and forwarding frames of data having a destination address not equal to the network address of the extended interface received from the remote system across the communication link to the first network; and
 means for managing communication across the communication link transparently to the first network.

27. The apparatus of claim 26, wherein the processor includes:
 memory to store a programmed set of network addresses;
 means, coupled to the communication link and the first network, and responsive to destination addresses in frames within the programmed set, for forwarding frames of data having a destination address within the programmed set from the first network across the communication link to the system.

28. The apparatus of claim 26, wherein the first network includes a plurality of local area networks, and further including:
 a bridge coupling the plurality of local area networks to the extended interface.

29. The apparatus of claim 26, wherein the network resources in the remote system comprise a multi-protocol router.

30. The apparatus of claim 26, further including:
management resources in the processor for responding with messages on the first network to frames in the event that the communication link is inoperable.

31. An apparatus that connects a first network through a first communication link to a first system on a second network and through a second communication link to a second system on a third network, the first and second systems providing network resources, the apparatus comprising:
first means, connected to the first communication link and to the first network and having a first network address, for providing a first extended interface to the network resources in the first system transparently to users of the first network by forwarding frames of data having a destination address equal to the first network address across the communication link to the first system and forwarding frames of data having a destination address not equal to the first network address received from the first system across the communication link to the first network; and
second means, connected to the second communication link and to the first network and having a second network address, for providing a second extended interface to the network resources in the second system transparently to users of the first network by forwarding frames of data having a destination address equal to the second network address across the communication link to the second system and forwarding frames of data having a destination address to the second network address received from the second system across the communication link to the first network.

32. The apparatus of claim 31, wherein the first means includes:
memory to store a programmed set of network addresses including the first network address;
means, coupled to the communication link and the first network, and responsive to destination addresses within a programmed set, for forwarding frames of data having a destination address within the programmed set from the first network across the communication link to the first system; and
means, coupled to the communication link and the first network, for forwarding frames received from the first system by way of the communication link to the first network, except frames of data having a destination address equal to the first network address.

33. The apparatus of claim 31, wherein the first network includes a plurality of local area networks, and further including:
a bridge coupling the plurality of local area networks to the first and second means.

34. The apparatus of claim 31, wherein the network resources in the first and second systems comprise multi-protocol routers.

35. The apparatus of claim 31, further including:
management resources for responding with messages on the first network to frames of data having a destination address equal to the first network address in the event that the first communication link is inoperable, and for responding on the first network to frames of data having a destination address equal to the second network address in the event that the second communication link is inoperable.

36. An apparatus that connects a system providing network resources on a first network through a communication link to a remote system on a second network, the apparatus comprising:
means, coupled with the system, for providing a local interface to the network resources for users of the first network in response to frames of data having a destination address equal to a first network address;
means, coupled with the system and having a unique network address, for providing an extended interface to the network resources for users of the second network through the communication link for frames of data having a destination address equal to the unique network address of the extended interface forwarded across the communication link by the remote system; and
means for managing the communication link transparently to the second network.

37. The apparatus of claim 36, wherein the network resources comprise:
means for routing frames of data according to multiple network protocols to systems in the first and second networks through the local and extended interfaces.

38. An apparatus that connects a local system having a local network address on a local network, to a plurality of remote networks through a corresponding plurality of communication links, the local system providing network resources for the local network and the plurality of remote networks, the apparatus comprising:
means, coupled with the local system, for providing a local interface to the network resources for frames of data having the local network address as a destination address from users of the first network;
means, coupled with the local system and the plurality of communication links, for providing a plurality of extended interfaces having respective network addresses on the corresponding plurality of remote networks to the network resources for frames of data having destination addresses equal to respective network addresses of the plurality of extended interfaces.

39. The apparatus of claim 38, wherein the network resources comprise:
means for routing frames of data through the first network and the plurality of remote networks according to a plurality of network protocols.

40. The apparatus of claim 38, wherein the network resources comprise a multiprotocol router.

41. A network intermediate system, comprising:
a first network interface adapted to be connected to a local area network;
a second network interface adapted to be connected to a wide area network; and
a processor, coupled to the first and second network interfaces, including local processor management resources, and boundary relay resources which encapsulate and transfer frames from users of the local area network received from the first network interface having one of a first set of at least one destination address through the second network interface, which decapsulate frames from a user of the wide area network received through the second network interface and transfer decapsulated frames not having one of a second set of at least one destination address through the first network interface to users of the local area network, and which transfer frames from a user of the wide area network received through the second network interface having a destination address equal to a particular address in the second set to the local processor management resources.

42. The intermediate system of claim 41, wherein one destination address in the first set consists of an assigned data link layer address; and wherein the first network interface comprises a data link layer adaptor responsive to the assigned data link layer address.

43. The intermediate system of claim 42, wherein the second network interface comprises an adaptor for connection to a point-to-point communication link.

44. A network intermediate system, comprising:
a first network interface adapted to be connected to a first local area network and responsive to a first address;
a second network interface adapted to be connected to a wide area network and responsive to a second address, at least one remote user of the wide area network coupled to a remote local area network;
a processor, coupled to the first and second network interfaces, including
multiprotocol router resources which generate intermediate system to end system addresses in response to routing protocols for frames having the first address received through the first network interface, and for frames from users of a remote local area network encapsulated in frames received through the second network interface from the wide area network having the second address, the routing resources including end system directories for at least the remote local area network and the first local area network, and boundary link resources which encapsulate frames having end system addresses supplied by the multiprotocol routing resources for transfer through the second network interface across the wide area networks and through at least one remote user of the wide area network to users of the remote local area network so that the multiprotocol router appears to users of the second network as if it was a station on the second network.

45. The intermediate system of claim 44, wherein the first address consists of an assigned data link layer address; and wherein the first network interface comprises a data link layer adaptor having the assigned data link layer address.

46. The intermediate system of claim 45, wherein the second network interface comprises an adaptor for connection to a point-to-point communication link.

* * * * *